United States Patent [19]
Sasaki et al.

[11] Patent Number: 6,137,569
[45] Date of Patent: Oct. 24, 2000

[54] SURVEY INSTRUMENT

[75] Inventors: Tsuneo Sasaki, deceased, late of Kuki, by Noriko Sasaki, successor; Fumio Ohtomo, Tokyo-to, both of Japan

[73] Assignee: Kabushiki Kaisha Topcon, Tokyo-to, Japan

[21] Appl. No.: 08/359,706

[22] Filed: Dec. 20, 1994

[30] Foreign Application Priority Data

Dec. 28, 1993 [JP] Japan ................................. 5-349733

[51] Int. Cl.⁷ .................................................. G01B 11/26
[52] U.S. Cl. ...................... 356/153; 356/138; 356/152.3
[58] Field of Search .................... 356/3, 3.15, 4.01, 356/138, 139, 139.04–139.08, 140, 141.1–141.4, 149, 150, 153, 151, 152.3, 400; 33/270–273, 277–278, 700; 250/559.38

[56] References Cited

U.S. PATENT DOCUMENTS

| | | |
|---|---|---|
| 3,898,676 | 8/1975 | Hosoe et al. ....................... 356/3.15 X |
| 4,717,251 | 1/1988 | Wells et al. |
| 4,968,147 | 11/1990 | Shoemaker .............................. 356/399 |
| 5,051,934 | 9/1991 | Wilklund. |
| 5,489,983 | 2/1996 | McClenahan et al. ............. 356/155 X |

Primary Examiner—Donald Hajec
Assistant Examiner—Daniel St. Cyr
Attorney, Agent, or Firm—Nields & Lemack

[57] ABSTRACT

The present invention provides a survey instrument, which comprises a solid state image sensor 4 where an image from a telescope is formed, an emitter 6 for emitting flash light toward a target, and a survey controller for detecting position of the center of the target on the solid state image sensor based on difference of image signals between on condition and off condition of the emitter of the solid state image sensor, or it comprises a telescope rotatable around at least one of vertical shaft center and horizontal shaft center, an angle detector for detecting angle of the telescope, a memory for memorizing image signal from the solid state image sensor, and a survey controller for calculating angular displacement based on angles which are detected by the angle detector when image signals in on and off conditions of the emitter are incorporated, for calculating difference between the two image signals by shifting them so that angular displacement of each image signal are offset, and for detecting position of the center of the target from the difference of the two image signals.

10 Claims, 4 Drawing Sheets

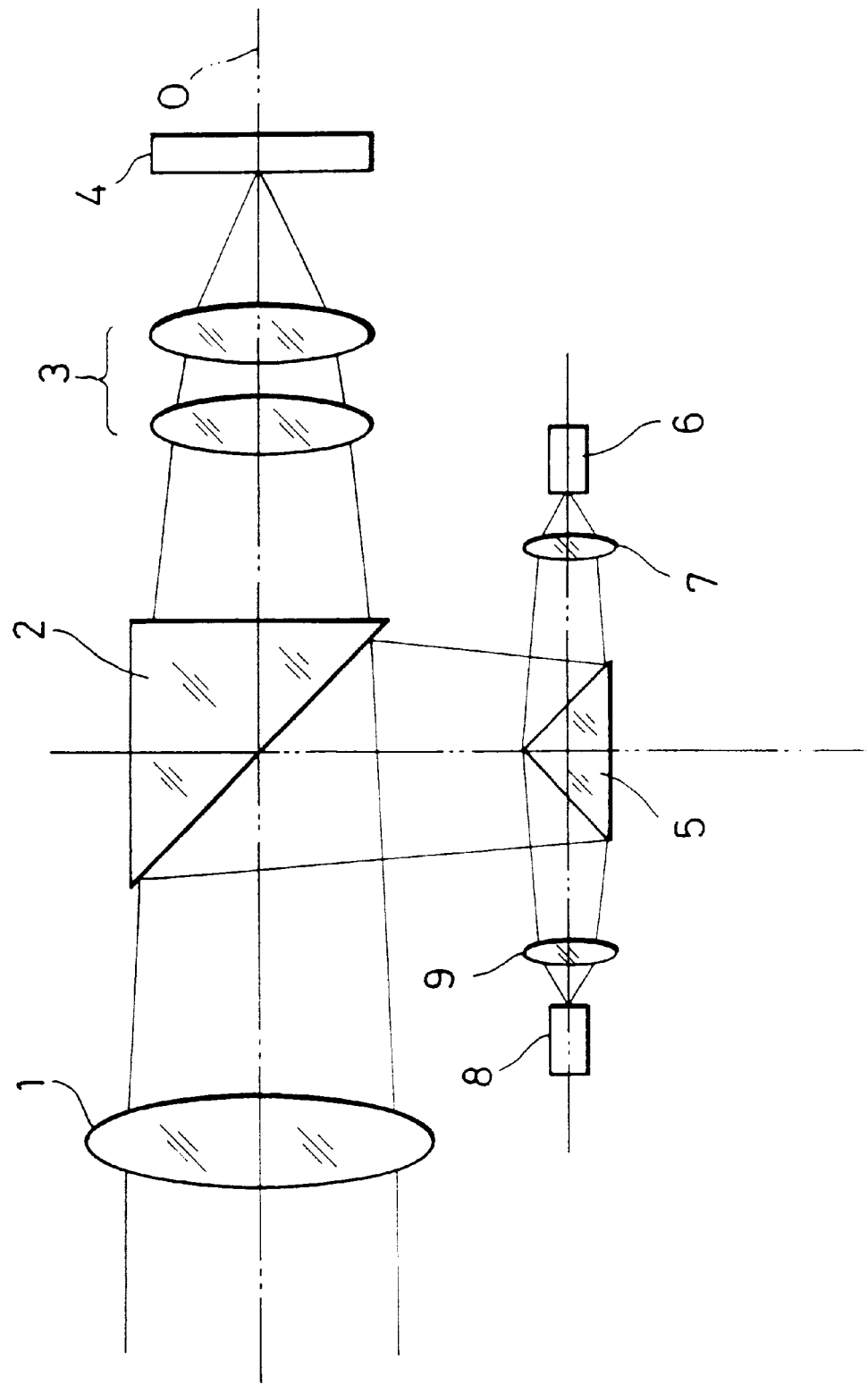

6,137,569

SURVEY INSTRUMENT

BACKGROUND OF THE INVENTION

The present invention relates to a survey instrument, and in particular to a survey instrument, by which it is possible to accurately and easily align the center of a target with optical axis of a telescope of the survey instrument.

When measuring distance or surveying horizontal angle or vertical angle, optical axis of telescope of a survey instrument must be aligned with the center of a target. Accuracy of this aligning exerts influence on the distance measurement or measurement of horizontal angle or vertical angle.

In a conventional type survey instrument, when optical axis of telescope of a survey instrument is aligned with the center of a target, a surveyor collimates by means of a telescope, adjusts vertical angle adjusting mechanism of the telescope and horizontal direction adjusting mechanism of the telescope in order to align reticle of the telescope with the target to be measured. Further, at a position where the surveyor judged that these are aligned with each other, distance and angle are electronically read and the read value is displayed on a display unit.

In the conventional method as described above, aligning accuracy differs according to each surveyor, and this causes individual difference. Even when measured by the same surveyor, there are variations in alignment accuracy due to adjustment in each surveying. Further, when the target is at a long distance, it is often difficult to identify the center of the target. In adjusting the vertical angle adjusting mechanism and the horizontal direction adjusting mechanism, it is necessary to lock and unlock a locking device and to repeatedly perform fine adjustment, and this leads to complicated procedure and requires much time.

SUMMARY OF THE INVENTION

Under such circumstances, it is an object of the present invention to provide a survey instrument, by which it is possible to automatically align optical axis of a telescope with the center of a target in order to eliminate individual difference between surveyors and to simplify aligning procedure and reduce the time required. To attain the above object, the survey instrument of the present invention comprises a solid state image sensor (CCD image sensor) where an image from telescope of a survey instrument is formed, an emitter for emitting flash light to a target, and a survey controller for detecting position of the center of the target on the solid state image sensor from difference of image signals between on and off conditions of the emitter of the solid state image sensor, or it comprises a telescope rotatable around at least one of vertical shaft center or horizontal shaft center, a solid state image sensor where an image from the telescope is formed, an angle detector for detecting angle of the telescope, an emitter for emitting flash light to a target from the telescope, a memory for memorizing image signals from the solid state image sensor, and a survey controller for calculating angular displacement based on angles which are detected by the angle detector when image signals in on and off conditions of the emitter are incorporated, for calculating difference between the two image signals by shifting them so that angular displacement of each image signal are offset, and for detecting position of the center of the target from the difference of the two image signals.

BRIEF DESCRIPTION OF THE DRAWINGS

FIG. 1 schematically illustrates an essential part of an embodiment of the present invention;

DETAILED DESCRIPTION OF THE PREFERRED EMBODIMENT

Figure 2A:
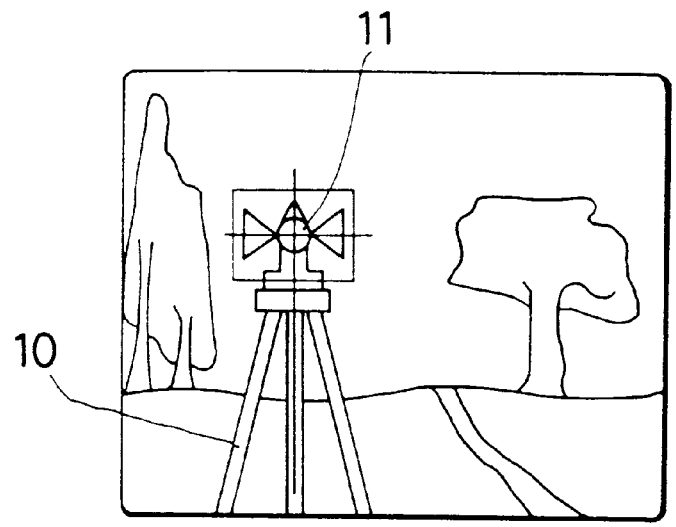
FIGS. 2A–C shows operation of the embodiment.

In the following, description will be given on an embodiment of the present invention in conjunction with the drawings.

FIG. 1 represents an essential part of the embodiment of the invention, where an objective lens 1, a dichroic mirror 2 for reflecting infrared light almost completely, a condenser lens 3, and a solid state image sensor 4 such as CCD image sensor are arranged on an optical axis O of a telescope. A triangle mirror 5 is arranged at a position to face the dichroic mirror 2. In parallel to optical axis of the telescope and with the triangle mirror 5 at the center, an emitter 6 for emitting flashing modulation light, e.g. near infrared light, and a condenser lens 7 are arranged on one side, and a light receiving element 8 and a condenser lens 9 on the other side.

Next, operation of the embodiment will be described.

Emitted light from the emitter 6 is reflected on the triangle mirror 5 and the dichroic mirror 2. After passing through the objective lens 1, light is directed to a target prism (not shown). Being reflected on the target prism, returning light passes through the same route as the emitted light and reaches the dichroic mirror 2. Most of the light is reflected by the dichroic mirror 2 and is reflected on the triangle mirror 5 and is sent toward the light receiving element 8. The returning light reflected by the triangle mirror 5 passes through the condenser lens 9 and is condensed on the light receiving element 8. A part of the returning light transmits the dichroic mirror 2, and after passing through the condenser lens 3, it is projected on the solid state image sensor 4.

From phase difference between light wave of the outgoing (emitted) light and light wave of the incoming (returning) light, the distance is determined.

Visible light coming through the objective lens 1 passes through the dichroic mirror 2 and condensed by the condenser lens 3 and an image is formed on the solid state image sensor. The formed image is displayed on a display unit such as a liquid crystal monitor, CRT, etc. as shown in FIG. 2.

Figure 2B:
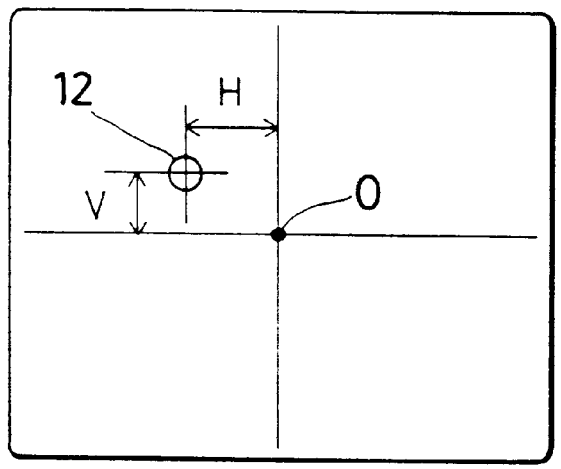
Figure 2C:
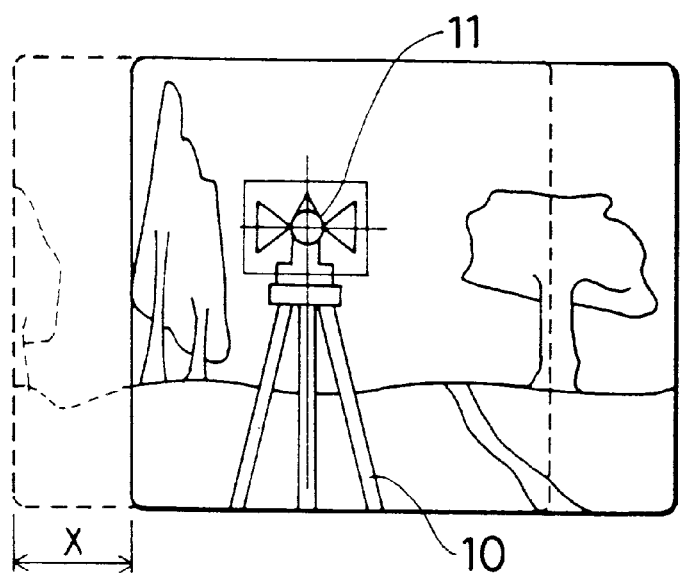

FIG. 2 (A) shows a target prism 11 placed on tripod 10 and its surrounding. When the emitter 6 is emitting light, an image of returning light from the target prism 11 is formed overlappedly in addition to that of visible light. Therefore, if difference between the image when the emitter 6 is turned on and the image when it is turned off is obtained, an image formed only by reflected light (returning light) 12 having approximately the same size as the target prism 11, coming from the target prism 11 as shown in FIG. 2 (B), is obtained.

Supposing that the center of the screen is a point aligned with the optical axis O, horizontal deviation H and vertical deviation V of the reflected light (returning light) 12 can be easily calculated based on the image. In shifting optical axis of the telescope by H in horizontal direction and by V in vertical direction, optical axis of the telescope can be aligned with the target prism 11.

Figure 4:
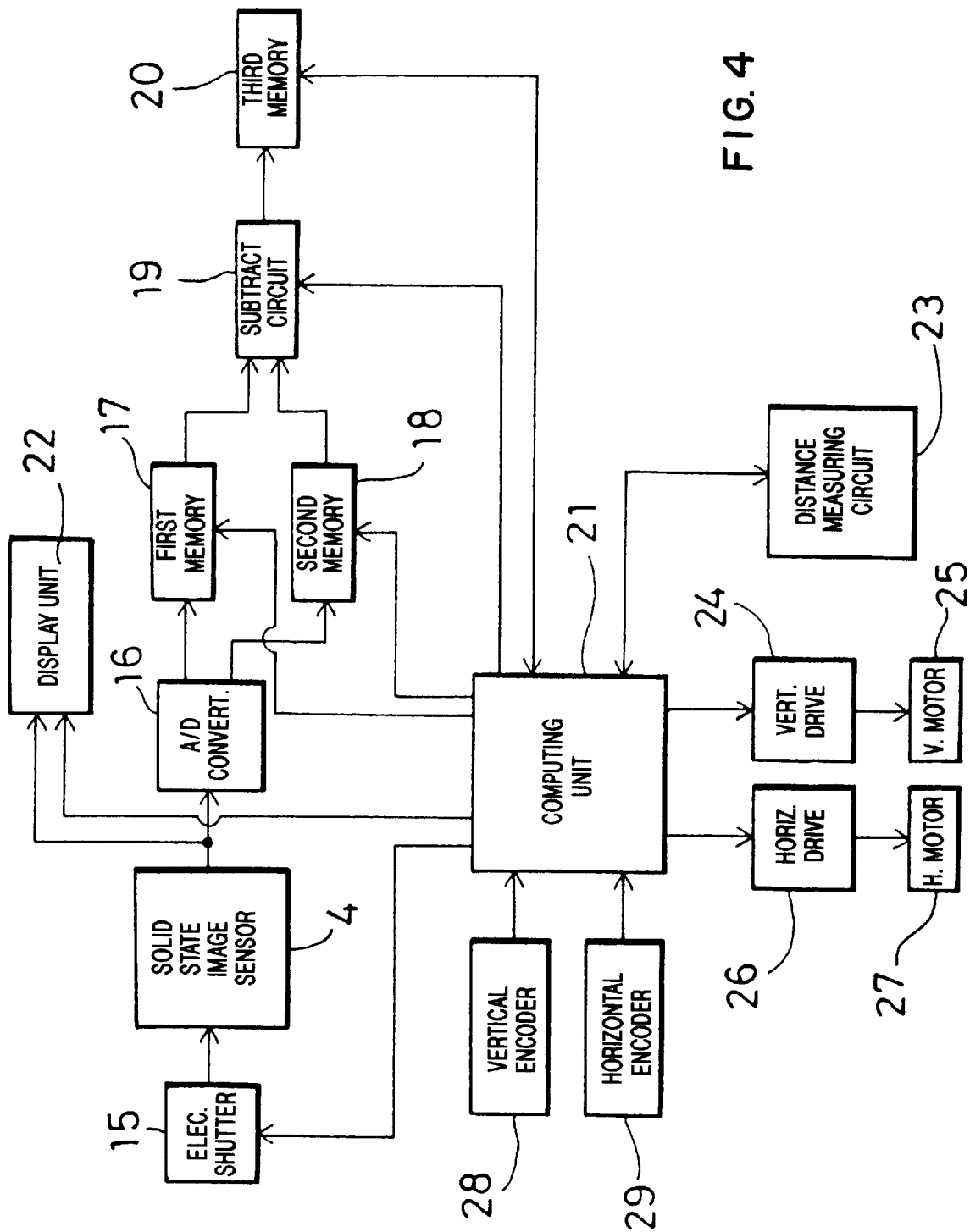
FIG. 4 is a control block diagram of the embodiment.

Next, description will be given on the survey controller, referring to FIG. 4.

At a given position of the optical axis O, an electronic shutter 15 is arranged, and incident light coming from the objective lens 1 passes through the electronic shutter 15 and forms an image on the solid state image sensor 4. To the solid state image sensor 4, an A/D converter 16 and a display unit 22 are connected. A first memory 17 and a second memory 18 are connected to the A/D converter 16, and a subtraction circuit 19 and a third memory 20 are sequentially connected to the first memory 17 and the second memory 18.

To the electronic shutter 15, the first memory 17, the second memory 18, the subtraction circuit 19, the third memory 20, and the display unit 22, a computing unit 21 is connected. To the computing unit 21, a distance measuring circuit 23, a vertical drive controller 24 and a horizontal drive controller 26 are connected. By the vertical drive controller 24, a vertical motor 25 is driven, and a horizontal motor 27 is driven by the horizontal drive controller 26. Further, a vertical encoder 28 for measuring angle of vertical and a horizontal encoder 29 for measuring horizontal angle are provided on optical axis of the telescope, and signals from the vertical encoder 28 and the horizontal encoder 29 are inputted to the computing unit 21.

In the following, description will be given on the operation.

The distance measuring circuit 23 comprises the emitter 6 and the light receiving element 8, and distance is calculated from phase difference between light wave of the outgoing (emitted) light and that of the incoming (returning) light. The results of the calculation are displayed on the display unit 22 via the computing unit 21.

Incident light coming from the objective lens 1 forms an image on the solid state image sensor 4, and photoelectric conversion is performed by the solid state image sensor 4. Image signal from the solid state image sensor 4 is converted to digital signal by the A/D converter 16, and by synchronizing signal from the computing unit 21 synchronized with flashing of the emitter 6 of the distance measuring circuit 23, image signal when the emitter 6 is turned on is memorized in the first memory 17, and image signal when the emitter 6 is turned off is memorized in the second memory 18.

The subtraction circuit 19 calculates image signals of the first memory 17 and the second memory 18, and the calculated difference is inputted to the third memory 20. The image signal memorized in the third memory 20 is image data shown in FIG. 2 (B). Based on the image data, the computing unit 21 calculates horizontal deviation H and vertical deviation V of the center of the reflected light (returning light) 12 from the optical axis O.

Figure 3:
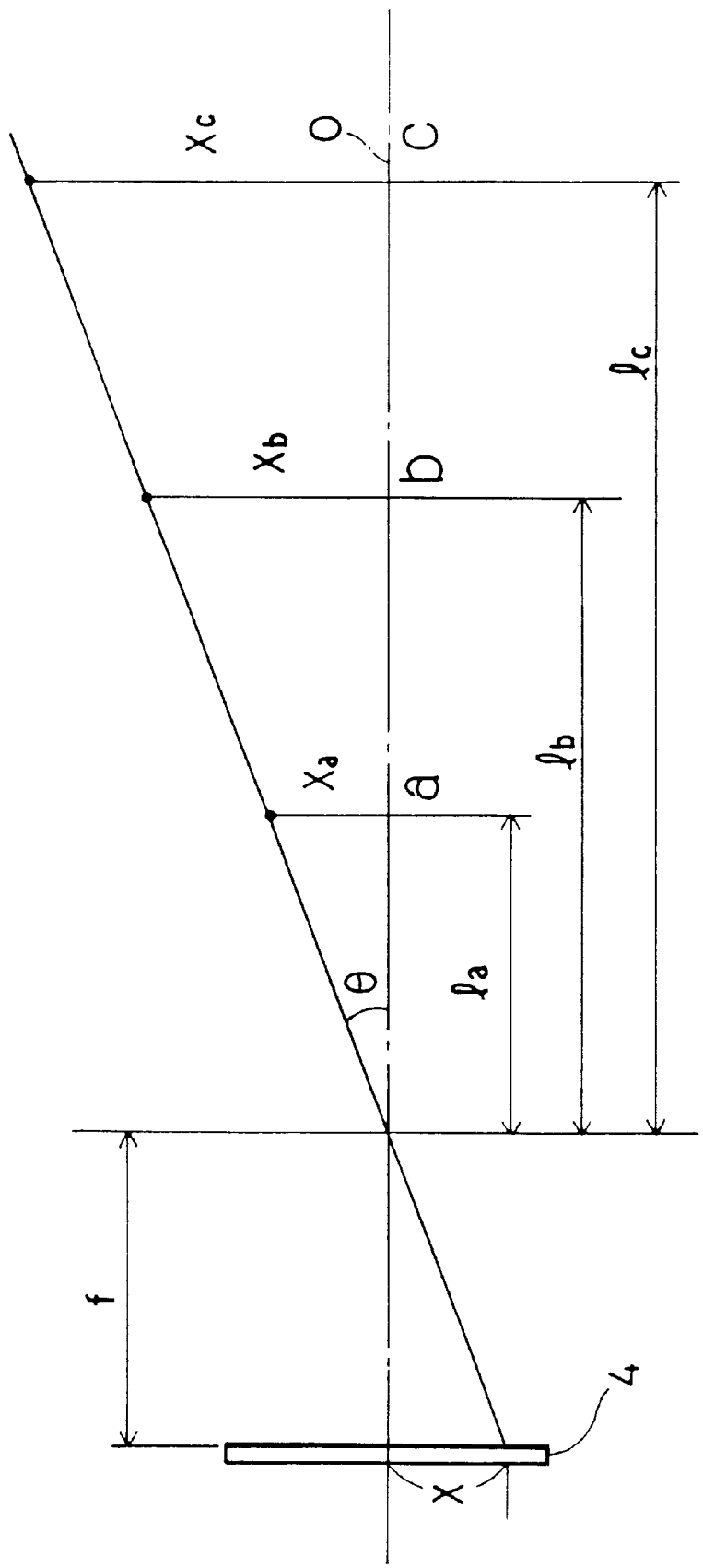
FIG. 3 represents relationship between deviation of a solid state image sensor and an angle corresponding to the deviation.

As shown in FIG. 3, when it is supposed that the solid state image sensor 4 is arranged at a focal length f of the lens and the angle of the reflected light (returning light) 12 entering the solid state image sensor 4 is $\theta$, deviation X from the optical axis O on the solid state image sensor 4 is f tan $\theta$. By obtaining the deviation X, rotating angle of the telescope required for adjustment is unimeaningly determined. Therefore, regardless of the distance 1a, 1b or 1c to the target prism 11, horizontal angle and vertical angle of the telescope to be corrected can be obtained by calculating horizontal deviation H and vertical deviation V on the image.

When the horizontal deviation H and the vertical deviation V are calculated, the computing unit 21 drives the vertical motor 25 and the horizontal motor 27 via the vertical drive controller 24 and the horizontal drive controller 26, and the center of the reflected light (returning light) 12 is aligned with the optical axis O.

On the other hand, the computing unit 21 can calculate the horizontal deviation H and the vertical deviation V as values of angles.

As described above, vertical angle of optical axis of the telescope is inputted by the vertical encoder 28, and the horizontal angle is inputted by the horizontal encoder 29, to the computing unit 21. Based on the angle of vertical and horizontal angle as well as the deviation V and the deviation H, vertical angle and horizontal angle of position of the center of the target are obtained, and it is possible to display the measured values on the display unit 22.

Therefore, based on horizontal angle, vertical angle obtained in relation to the deviation and angle of the optical axis O of the telescope, it is also possible to determine horizontal angle and vertical angle of the position of the center of the target when the target is detected without aligning the optical axis O of the telescope with the center of the target.

In the above, the difference between the image when the emitter 6 is turned on and the image when the emitter 6 is turned off is obtained while the survey instrument main unit stands still in order to obtain the image of the reflected light (returning light) 12 from the target prism 11, whereas it is possible to obtain the image of the reflected light (returning light) 12 from the target prism 11 based on the difference between the image when the emitter 6 is turned on and the image when the emitter 6 is turned off in case the survey instrument main unit is rotating. Further description will be given on such case.

The speed moving over the image of the survey instrument is calculated by the computing unit 21 based on pulse signals from the vertical encoder 28 and the horizontal encoder 29. Therefore, a shutter speed not to cause blur even at the speed over the image as calculated is obtained by the computing unit 21, and the speed of the electronic shutter 15 is controlled and driven so as to attain the shutter speed.

Further, the electronic shutter 15 is synchronized with and driven at the timing to turn on the emitter 6 and image signal when the emitter 6 is turned on is incorporated and is memorized in the first memory 17. Image signal when the emitter 6 is turned off is incorporated and is memorized in the second memory 18.

The condition of the image in this case is explained, referring to FIG. 2 (C). Here, it is supposed that the survey instrument can be rotated only around vertical axis. In FIG. 2 (C), solid lines indicate the condition where the survey instrument is moved to align the target prism with collimation axis of the telescope and the emitter 6 is emitting light. Next, when the emitter 6 is turned off and the image is incorporated, the survey instrument is rotated, and the condition is as shown by broken line. In the two images thus incorporated, a deviation X occurs. Accordingly, if the difference between the two images is obtained, the image of the target prism 11 is deviated by X, and differential image relating to the image of the target prism 11 cannot be obtained.

For this reason, the deviation X of the two images is obtained, and one of the two images is shifted and overlapped with the other so that the deviation X can be offset, and the difference between the two images is obtained. By counting the number of pulses issued from the horizontal encoder 29, issued at time difference $\Delta t$ in incorporating image signal between the image memorized on the first memory 17 and the image memorized on the second memory 18, rotating angle of the telescope, i.e. the deviation X, can be easily obtained.

The procedure after one of the images is shifted and the two images are overlapped with each other is the same as in the case where the survey instrument is not rotated, and detailed description is not given here.

Thus, the optical axis O and the center of the target prism 11 can be aligned with each other without any man-made operation by the surveyor. Further, positioning of the optical axis O with the target prism 11 is the positioning on secondary picture of the solid state image sensor 4. As a result, it is possible to perform positioning with high accuracy regardless of the distance between the target prism 11 and the survey instrument.

Further, it is possible to align the optical axis O with the center of the target prism 11 without any man-made operation of the surveyor regardless of whether the survey instrument is in stationary condition or in rotating condition.

When the center of the prism is aligned with the optical axis O of the telescope, LED incorporated in the survey instrument emits light, or message is displayed on the display unit 22 to inform the surveyor of the alignment of the center of the prism with the optical axis O of the telescope.

If the positioning operation is performed intermittently, the telescope follows the target prism 11 even when the surveyor moves the target prism 11. Thus, the target prism 11 is not deviated from visual field of the telescope, and this extensively simplifies the operation.

In determining horizontal angle and vertical angle of the center of the target, it is possible to determine them without aligning the optical axis O of the telescope with the center of the target prism, and the measured value can be displayed for the surveyor on the display unit 22. As a result, working efficiency and measuring accuracy can be improved because it is possible to determine the angles without aligning the optical axis O with the center of the target prism.

The optical axis O of the telescope is usually shown by reticle line in optical system of the telescope, while it is obtained as an image by illuminating the reticle in the present embodiment. In the above embodiment, the electronic shutter 15 is provided, while the electronic shutter 15 may be omitted if the image signals incorporated in the first memory 17 and the second memory 18 by the computing unit 21 are strictly limited in accordance with flashing of the emitter 6. Further, an other emitter may be provided for target positioning in addition to the above emitter 6, and by flashing the emitter, the difference between on and off conditions of the emitter may be obtained. Also, it is possible to increase intensity difference between the surrounding scenery and the target prism image by using the electronic shutter and an emitter with high irradiation output and by reducing the time to open the electronic shutter and to turn on the emitter in synchronized condition. In the above embodiment, the first, the second and the third memories are provided, while a first, a second and a third areas may be set on a memory and each of these areas may be used in the same operation as a first, a second and a third memories. The telescope may be rotated around one of vertical shaft center and horizontal shaft center. Further, instead of the encoder for angle detection, an angle detector using differential transformer may be used.

What we claim are:

1. A survey instrument, comprising a solid state image sensor, a telescope for receiving light from a target, said telescope having an optical axis along which said light travels toward said sensor, an emitter for emitting flash light toward said target, said emitter being in an on condition during each said flash and in an off condition between said flashes, and a survey controller for calculating the difference of image signals from the solid state image sensor between while said emitter is in on condition and while in off condition, whereby the center position of the image of the target on the solid state image sensor is detected, based on the position of the image of the emitter.

2. A survey instrument, comprising a solid state image sensor, a telescope for receiving light from a target, said telescope having an optical axis along which said light travels toward said sensor, said telescope being rotatable around at least one of vertical shaft center and horizontal shaft center, an angle detector for detecting angle of the telescope, an emitter for emitting flash light toward said target for reflection therefrom, a memory for memorizing image signal from the solid state image sensor, and a survey controller for calculating angular displacement based on angles which are detected by the angle detector when a first image signal in on condition and a second image signal in off condition of the emitter are incorporated with said telescope rotating, for calculating the amount of deviation on the solid state image sensor based on an angular displacement, for calculating a difference between the two image signals when one of the image signals is shifted by said amount of deviation, for extracting only an image signal of the image of the target on the solid state image sensor by said difference between the two image signals, and for detecting the center position of the target based on the extracted signal.

3. A survey instrument according to claim 1 or 2, wherein the survey controller comprises a computing unit for calculating deviation between the center position of the target and optical axis of the telescope in the solid state image sensor.

4. A survey instrument according to claim 2, wherein there is provided a computing unit for obtaining horizontal angle and vertical angle of position of the center position of the target based on output of the angle detector for detecting angle of the telescope and on value of the angle.

5. A survey instrument according to claim 4, wherein there is provided a display unit for displaying horizontal angle and vertical angle of position of the center position of the target determined by the computing unit.

6. A survey instrument according to claim 4, wherein information is issued when horizontal angle and vertical angle of position of the center position of the target are obtained.

7. A survey instrument according to claim 1 or 2, wherein the survey controller comprises two memories for memorizing image signals, whereby time to incorporate image signals of the two memories is controlled, and an image signal on the solid state sensor when the emitter is in on condition is incorporated to one of the memories and an image signal on the solid state sensor when the emitter is in off condition is incorporated to the other memory.

8. A survey instrument according to claim 1 or 2, wherein the telescope is rotatably supported independently around vertical shaft center and horizontal shaft center respectively, a motor is provided to rotate the telescope with respect to the two shaft centers, and the survey controller drives the motor to eliminate deviation calculated by the computing unit.

9. A survey instrument according to claim 8, wherein information is issued when the optical axis of the telescope is aligned with the center of the target.

10. A survey instrument according to claim 2, wherein an electronic shutter is provided, and the image of the target is incorporated through the electronic shutter.

* * * * *